(12) United States Patent
Bilski et al.

(10) Patent No.: US 10,118,112 B2
(45) Date of Patent: Nov. 6, 2018

(54) FLUID FILTER

(71) Applicant: Fram Group IP LLC, Lake Forest, IL (US)

(72) Inventors: Gerard W. Bilski, Perrysburg, OH (US); Donald W. Baldwin, Jr., Louisville, KY (US)

(73) Assignee: Fram Group IP, LLC, Lake Forest, IL (US)

( * ) Notice: Subject to any disclaimer, the term of this patent is extended or adjusted under 35 U.S.C. 154(b) by 145 days.

(21) Appl. No.: 15/273,315

(22) Filed: Sep. 22, 2016

(65) Prior Publication Data

US 2017/0007948 A1  Jan. 12, 2017

Related U.S. Application Data

(62) Division of application No. 14/192,537, filed on Feb. 27, 2014, now Pat. No. 9,486,718.

(60) Provisional application No. 61/770,647, filed on Feb. 28, 2013, provisional application No. 61/770,637, filed on Feb. 28, 2013.

(51) Int. Cl.
| | | |
|---|---|---|
| *B01D 35/00* | (2006.01) | |
| *B01D 35/30* | (2006.01) | |
| *F01M 1/10* | (2006.01) | |
| *B01D 27/08* | (2006.01) | |

(52) U.S. Cl.
CPC ........... *B01D 35/005* (2013.01); *B01D 27/08* (2013.01); *B01D 35/30* (2013.01); *F01M 1/10* (2013.01); *B01D 2201/342* (2013.01)

(58) Field of Classification Search
None
See application file for complete search history.

(56) References Cited

U.S. PATENT DOCUMENTS 3,153,541 A * 10/1964 Rudder ................ F16J 15/127
                                                            277/639
3,224,585 A    12/1965  Scavuzzo
3,224,591 A    12/1965  Sawyer
(Continued)

FOREIGN PATENT DOCUMENTS

JP        10151303      6/1998
KR      102005007396    7/2005

OTHER PUBLICATIONS

International Search Report and Written Opinion of PCT/US2012/030543 dated Oct. 15, 2012.
(Continued)

*Primary Examiner* — Benjamin M Kurtz
(74) *Attorney, Agent, or Firm* — Elizabeth A. Peters; Barnes & Thornburg LLP (57) ABSTRACT

A fluid filter such as an oil filter for a vehicle is provided. The fluid filter includes a body having a first, closed end and a second, open end. A plate is coupled to the second end, the plate having a first surface and a threaded portion having a thread pitch. A channel member has an outer edge coupled to the second end of the body, wherein the channel member defines a recess with an open side opposite the first surface of the plate. A stop member is disposed within the recess of the channel member, the stop member having a first height. A sealing member is coupled to the stop member, and the sealing member has a second height greater than the first height of the stop member.

7 Claims, 5 Drawing Sheets

(56) References Cited

U.S. PATENT DOCUMENTS

| | | | | |
|---|---|---|---|---|
| 3,279,805 A | * | 10/1966 | Quinson | F16J 15/127 |
| | | | | 277/611 |
| 4,428,590 A | | 1/1984 | Pippert | |
| 4,473,471 A | | 9/1984 | Robichaud | |
| 4,671,325 A | * | 6/1987 | Otter | F15B 1/22 |
| | | | | 138/30 |
| 5,207,131 A | | 5/1993 | Pool et al. | |
| 5,301,958 A | * | 4/1994 | Covington | B01D 27/08 |
| | | | | 277/641 |
| 5,353,666 A | | 10/1994 | Rogers | |
| 5,490,930 A | | 2/1996 | Krull | |
| 5,817,234 A | | 10/1998 | Dye | |
| 5,845,552 A | | 12/1998 | Piascik | |
| 5,876,600 A | | 3/1999 | Matsubara et al. | |
| 5,906,740 A | | 5/1999 | Brown et al. | |
| 5,928,513 A | | 7/1999 | Bradford | |
| 6,217,762 B1 | | 4/2001 | Rooney et al. | |
| 6,877,632 B2 | | 4/2005 | Gerdes | |
| 8,685,243 B2 | | 4/2014 | Bilski | |
| 2005/0056124 A1 | | 3/2005 | Zulauf et al. | |
| 2007/0034631 A1 | | 2/2007 | Minowa et al. | |
| 2008/0006573 A1 | * | 1/2008 | Wolf | B01D 27/08 |
| | | | | 210/450 |
| 2012/0261323 A1 | | 10/2012 | Badeau et al. | |

OTHER PUBLICATIONS

Non-Final Office Action issued in U.S. Appl. No. 13/305,128 dated Sep. 19, 2013.

Final Office Action issued in U.S. Appl. No. 13/305,128 dated Nov. 25, 2013.

Non-Final Office Action issued in U.S. Appl. No. 13/737,418 dated Aug. 1, 2013.

Final Office Action issued in U.S. Appl. No. 13/737,418 dated Nov. 5, 2013.

* cited by examiner

FLUID FILTER

CROSS REFERENCE TO RELATED APPLICATIONS

This application is a divisional of U.S. Pat. No. 9,486,718 titled "Fluid Filter" filed on Feb. 27, 2014 and issued on Nov. 8, 2016, which claims the benefit of U.S. Provisional Patent Application Ser. No. 61/770,637 titled "Fluid Filter" and filed Feb. 28, 2013, and U.S. Provisional Patent Application Ser. No. 61/770,647 titled "Fluid Filter" and filed Feb. 28, 2013, the contents of which are incorporated herein by reference in their entirety.

BACKGROUND

1. Field of the Disclosure

The subject matter disclosed herein relates to a fluid filter and, more particularly, to a replaceable fluid filter having features for assisting in installation of the fluid filter.

2. Description of the Background

Vehicles having internal combustion engines, such as automobiles, for example, typically have replaceable filters that remove contaminants from the fluid. For oil lubrication fluids, the oil will be periodically drained and replaced with new oil. The oil lubrication system includes a filter that removes particulates from the oil during operation. Usually, this filter is replaced at the same time the oil is changed, since the filtering medium within the filter will gradually become less effective over time as the particulate becomes trapped within the filter.

The removal and installation of an oil filter is usually accomplished using a specifically designed tool, sometimes referred to as a filter wrench. Since the lubrication system is under pressure, the oil filter is installed to a particular torque level to ensure a desired seal between the filter and the engine. It should be appreciated that under tightening the oil filter may result in oil leakage and over tightening the oil filter may result in difficulty in removing the filter during the next oil change.

Accordingly, while existing fluid filters are suitable for their intended purposes, the need for improvement remains, particularly in providing a fluid filter that assists the operator in installing the filter in a desired manner.

SUMMARY

In an illustrative embodiment, a fluid filter includes a body having a first, closed end and a second, open end. A plate is coupled to the second end, the plate having a first surface and a threaded portion having a thread pitch. A channel member has an outer edge coupled to the second end of the body, wherein the channel member defines a recess with an open side opposite the first surface of the plate. A stop member is disposed within the recess of the channel member, the stop member having a first height. A sealing member is coupled to the stop member, and the sealing member has a second height greater than the first height of the stop member.

In another illustrative embodiment, a fluid filter includes a body having a first, closed end and a second, open end. A channel member has an outer edge coupled to the second end of the body, the channel member defining a recess. A stop member is disposed within the recess of the channel member. The stop member includes a first surface with a first groove and a second, opposite surface with a second groove. A first sealing member is coupled to the first groove of the stop member, and a second sealing member is coupled to the second groove of the stop member. The first sealing member has a first height extending beyond the first surface of the stop member, and the second sealing member has a second height extending beyond the second surface of the stop member.

In a further illustrative embodiment, a method of forming a fluid filter includes a body having a first, closed end and a second, open end and a channel member having an outer edge coupled to the second end of the body, wherein the channel member defines a recess. The fluid filter further includes a stop member disposed within the recess of the channel member and having a first height, wherein a projection extends from a surface of the stop member, the projection including a plurality of apertures therethrough. A sealing member is disposed within the recess of the channel member, wherein a groove is formed in a surface of the sealing member and couples with the projection of the stop member, wherein a portion of the sealing member is molded around the projection of the stop member such that material of the sealing member extends through the apertures in the projection.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing features, and other features and advantages of the invention, are apparent from the following detailed description taken in conjunction with the accompanying drawings in which:

Other aspects and advantages of the present invention will become apparent upon consideration of the following detailed description, wherein similar structures have like or similar reference numerals.

DETAILED DESCRIPTION

The present invention is directed to fluid filters. While the filters of the present invention may be embodied in many different forms, several specific embodiments are discussed herein with the understanding that the present invention is to be considered only as an exemplification of the principles of the invention, and it is not intended to limit the invention to the embodiments illustrated.

Fluid filters are used in a wide variety of applications. For example, fluid filters are used with internal combustion engines to remove contaminants, such as particulates, from a fluid stream. The fluid filters are installed to provide a desired level of sealing between the fluid filter and corresponding equipment (e.g. the engine). It is desirable to have the fluid filter installed without under tightening, which could result in leakage, or over tightening, which could make it difficult to remove the filter after a period of operation. The illustrative embodiments herein include different features that allow the operator to tighten the filter against a positive stop that provides for a desired sealing level.

Figure 1:
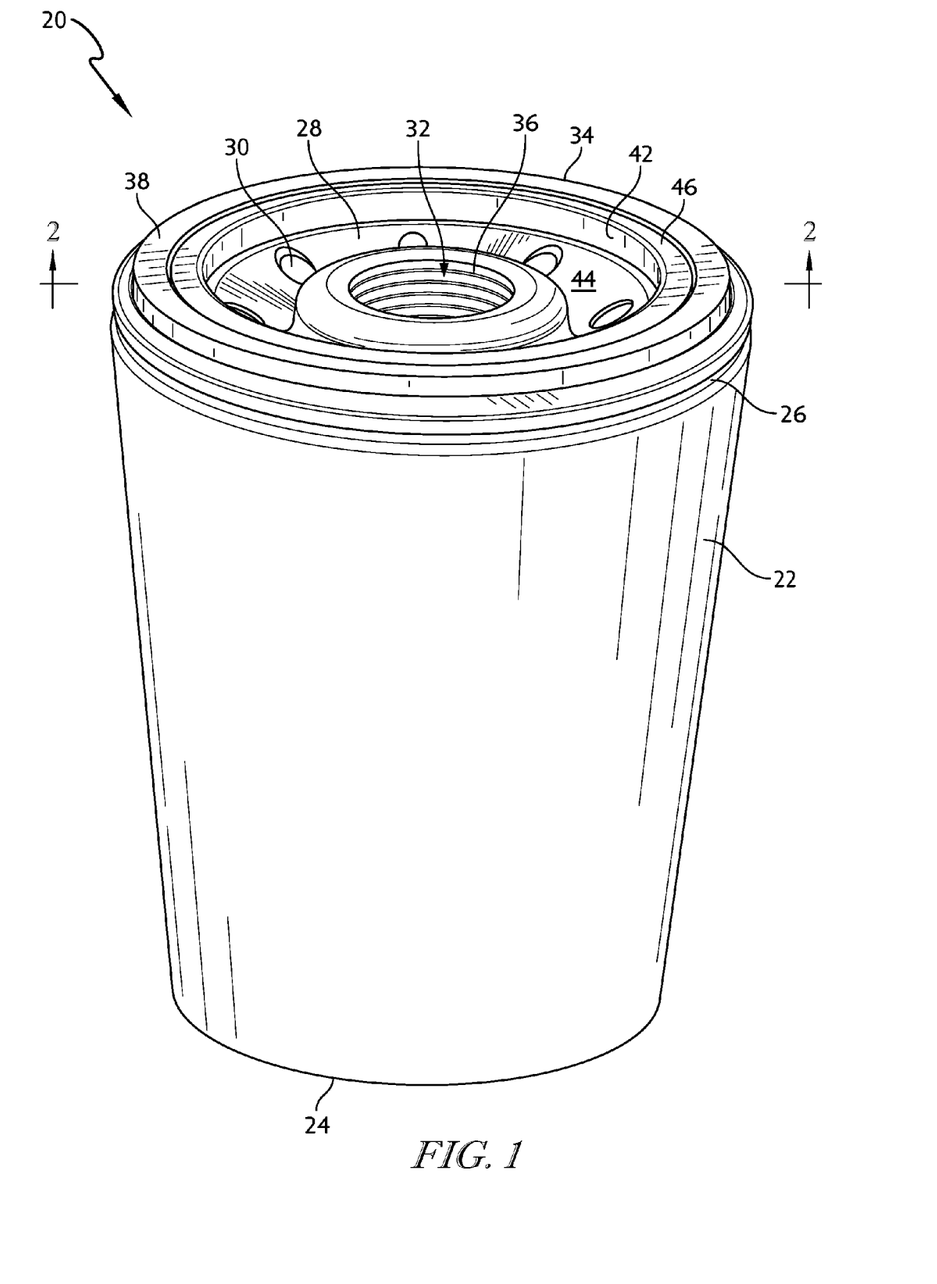
FIG. 1 is top a perspective view of a fluid filter incorporating an t embodiment of a feature for assisting in the installation of a fluid filter.

Referring to FIG. 1, there is shown a fluid filter 20, such as a replaceable oil filter for an internal combustion engine. The filter 20 includes a generally hollow cylindrical body 22 that defines a space for a filter medium (not shown). A first end 24 of the body 22 is closed. The first end 24 may include one or more surfaces that allow a user to couple a tool to the filter 20 during installation. A second, opposite end 26 is enclosed by a tapping plate 28. The tapping plate 28 may be coupled to the body 22 by a crimped connection, for example. The tapping plate 28 may include one or more openings 30, 32 to allow a working fluid to enter and exit the filter 20. In an illustrative embodiment, the opening 32 includes a threaded portion 36 that is sized to couple to a threaded member on an engine. In an illustrative embodiment, the threaded portion 36 has a ¾ inch major diameter with 16 threads per inch or $^{13}/_{16}$ inch diameter with 16 threads per inch (American Standard). In embodiments having a metric thread, the threaded portion 36 may be sized as a 20 mm×1.5, 18 mm×1.5, or 22 mm×1.5 thread (ISO Metric).

Figure 2:
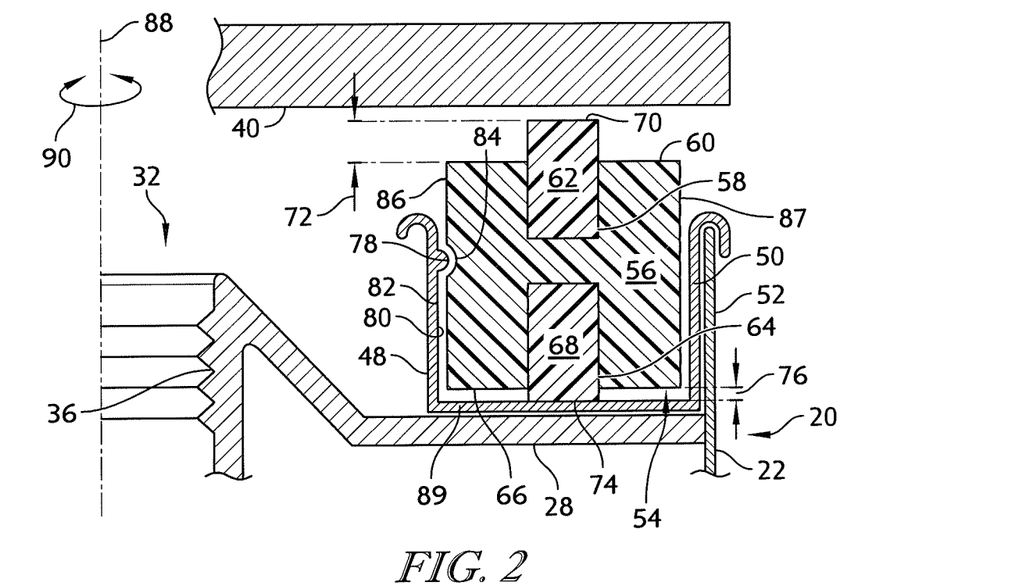
FIG. 2 is a partial cross-sectional view of a further feature for assisting in the installation of a fluid filter depicted on the fluid filter of FIG. 1 and taken generally along the lines 2-2 of FIG. 1.

A seal, such as a gasket 34, may be coupled to the second end 26. The gasket 34 forms a seal between the filter 20 and a mating system (e.g. an internal combustion engine). It should be appreciated that the integrity of the seal formed by the gasket 34 on an adjoining surface will depend on the amount of compression of the gasket 34. It is desirable to have the compression fall within a predetermined range to avoid under compressing or over compressing the gasket. In an automotive application, a target compression is created by rotating the filter 20 between three-quarters and one turn after a contact surface 38 engages surface 40 of the engine mounting base (FIG. 2). It should be appreciated that in many applications, it is difficult for the installer to see the filter and judge whether the filter has been turned the desired amount.

In an illustrative embodiment, the filter 20 includes a stop member 42. The stop member 42 is disposed between the contact surface 38 and an outer surface 44 of the tapping plate 28. The stop member 42 includes a surface 46 that is offset from the contact surface 38. During installation, the stop member 42 contacts the surface 40 preventing further tightening of the filter 20. Therefore, the amount of offset between the surfaces 38, 46 determines the amount of compression of the gasket 34. In the exemplary embodiment, the offset is about three-quarters of the thread pitch of threaded portion 36. In an illustrative embodiment, the offset is about 0.045 inches (1.145 mm).

Referring to FIG. 2 a channel member 48 may be coupled, such as by welding, for example, between the tapping plate 28 and the body 22. The channel member 48 has a generally thin walled body with an outer peripheral edge 50 adjacent an outer edge 52 of the body 22. The channel member 48 defines an annular recess 54 having an open end. The recess 54 is sized to receive an annular stop member 56. The stop member 56 includes a groove 58 in a top or outer surface 60 of the stop member 56 sized to receive an upper gasket 62 and a groove 64 in a lower surface 66 of the stop member 56 sized to receive a lower gasket 68. A contact surface 70 defined by an upper or outer surface of the upper gasket 62 is offset from the outer surface 60 of the stop member 56 by a distance 72. More specifically, the upper gasket 62 extends outwardly beyond the stop member 56 by the distance 72. A contact surface 74 defined by a lower or inner surface of the lower gasket 68 is offset from the lower surface 66 of the stop member 56 by a distance 76. More specifically, the lower gasket 68 extends beyond the stop member 56 by the distance 76. In an illustrative embodiment, the combination or sum of the distance 72 and the distance 76 is about three-quarters of the pitch of the threaded portion 36. In another illustrative embodiment, the combination or sum of the distance 72 and the distance 76 is about 0.045 inches (1.145 mm). In illustrative embodiments, the distances 72, 76 may be the same, the distance 72 may be greater, or the distance 76 may be greater. In still another illustrative embodiment, the distance 76 may be zero. While upper and lower gaskets are depicted, the lower gasket 68 may be eliminated without departing from the scope of the present invention.

The stop member 56 may be made from a suitable light-weight, low cost moldable plastic material, such as nylon, for example. The use of nylon as a material for the stop member 56 may provide advantages over, for example, metal, in that it reduces the risk of marring the interface between the surface 40 and the upper gasket 62 and/or the filter 20. Optionally, the stop member 56 may be made of any other suitable material or combinations of materials that are compatible with oil in the range of oil temperatures encountered in a vehicle. The gaskets 62 and 68 may be made from an elastomer (rubber), a similar compressible material, or any other suitable material or combinations of materials.

In an illustrative embodiment, the channel member 48 further may include a projection 78 extending outwardly from an inner surface 80 of an inner wall 82 of the channel member 48. The projection 78 may extend into a groove 84 formed in an inner surface 86 of stop member 56. In an alternative illustrative embodiment, the stop member 56 may include a projection that extends into a complementary groove in the channel member 48. In a further illustrative embodiment, a projection and a groove may alternatively or additionally be disposed in an outer surface 87 of the stop member 56 and the outer peripheral edge 50 of the channel member 48. The projection 78 and the groove 84 may be continuous or may include multiple discrete segments. The coupling of the channel member 48 and the stop member 56 allows the channel member 48 to retain the stop member 56 within the recess 54 defined by the channel member 48 while still allowing rotation of the filter 20 during installation. In particular, if a single or multiple projections 78 are utilized, the projection 78 may prevent movement of the stop member 56 out of the recess 54 along a longitudinal axis 88 and/or rotationally through the recess 54 (for example, if multiple discrete projections and grooves are used) and about the longitudinal axis, as depicted by reference numeral 90.

While the stop member 56 and the gaskets 62, 68 are depicted herein as each being a single, unitary piece, one or more of the stop member 56, the gasket 62, and/or the gasket 68 may include multiple stop or gasket members either spaced from or adjacent one another. Further, while the recess 54, the step member 56, and the gaskets 62, 68 are shown and described as being annular, the recess 54, the step member 56, and/or the gaskets 62, 68 may have any other suitable shape. Still further, while specific dimensions are described herein, the components of the stop member 56 and the gaskets 62, 68 may have any suitable dimensions.

To install the filter 20, an older filter is first removed from the system (e.g., the internal combustion engine, not shown). With the old filter removed, the threaded portion 36 is coupled to the corresponding threaded stem on the engine. Rotation of the filter 20 causes tightening of the filter and compression of the gaskets 62, 68 until the outer surface 60 and the lower surface 66 of the stop member 56 are in contact with the surface 40 and a horizontal wall 89 of the channel member 48, respectively. At that point, the torque required to continue rotation increases dramatically, thereby indicating to the installer that the filter 20 has been installed properly and the gasket 62, 68 and the stop member 56 have been compressed the desired amount. It should be appreciated that the filter 20 provides advantages in allowing a desired seal to be formed between the filter 20 and the engine without the installer having to monitor the number of turns or the mount that the filter 20 is rotated. As noted above, the lower gasket 68 may be omitted, in which case, the distance 72 may be sufficient for accurate installation.

Figure 3:
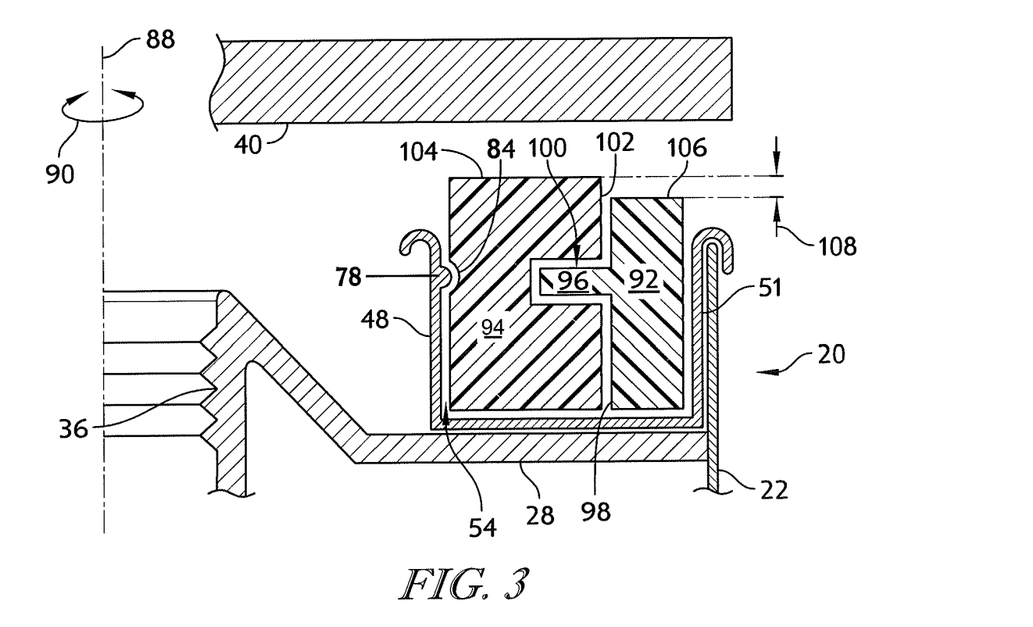
FIG. 3 is a partial cross-sectional view similar to FIG. 2 and depicting a second embodiment of a feature for assisting in installation of a fluid filter.

Referring to FIG. 3, a cross-sectional view of a further illustrative embodiment of a feature for assisting in installation of the filter 20 is shown. The embodiment of FIG. 3 is similar to the embodiment of FIG. 2 and, thus, like components will be referenced with like reference numerals. The annular recess 54 defined by the channel member 48 may be sized to receive an annular stop member 92 and an annular gasket 94. A projection 96 may extend outwardly from an inner face 98 of the stop member 92. In an illustrative embodiment, the projection 96 may be located on the inner face 98 of the stop member 92 approximately halfway along a height of the stop member 92. A groove 100 may be formed in an outer surface 102 of the gasket 94, wherein the projection 96 extends into the groove 100. A contact surface 104 formed by an upper or outer surface of the gasket 94 is offset from a contact surface 106 formed by an upper or outer surface of the stop member 92 by a distance 108. In an illustrative embodiment, the distance 108 is about three-quarters of the pitch of the threaded portion 36. In another illustrative embodiment, the distance 108 is about 0.045 inches (1.145 mm).

The stop member 92 may be arranged radially inwardly of the gasket 94, or the stop member 92 may be arranged radially outwardly of the gasket 94. Optionally, the groove 100 may be formed in the annular stop member 92 and the projection 96 may be formed in the gasket 94. In illustrative embodiments, the stop member 92 may be integrated into the channel member 48, the tapping plate 28, and/or the body 22.

Although the projection 96 and the groove 100 are shown as being midway along the stop member 92 and the gasket 94, respectively, the projection 96 and the groove 100 may be formed at any point along the stop member 92 and the gasket 94, respectively. The projection 96 and the groove 100 may be comprised of a single annular projection 96 extending into a single annular groove 100 or a plurality of annular projections 96 spaced along the longitudinal axis 88 and extending into a plurality of annular grooves spaced along the longitudinal axis 88. In an illustrative embodiment, the projection 96 may be comprised of a single annular projection or a plurality of discontinuous projections and the groove 100 may be comprised of a single annular groove or a plurality of discontinuous grooves.

To install the filter 20, an old filter is first removed from the system (e.g. the internal combustion engine, not shown). With the old filter removed, the threaded portion 36 is coupled to the corresponding threaded stem on the engine. The filter 20 is then rotated until the contact surface 104 of the gasket 94 contacts the surface 40 of the engine. The person installing the filter 20 continues to rotate the filter 20, thereby compressing the gasket 94, until the surface 40 contacts the contact surface 106 of the stop member 92. At that point, the torque required to continue rotation increases dramatically, thereby indicating to the installer that the filter 20 has been installed properly and that the gasket 94 and the stop member 92 have been compressed to the desired amount. It should be appreciated that the filter 20 provides advantages in allowing a desired seal to be formed between the filter 20 and the engine without the installer having to monitor the number of turns or the amount that the filter 20 is rotated.

The stop member 92 and the gasket 94 may be coupled to the channel member 48 and/or each other in any suitable manner, for example, by adhesive, a friction fit, an interference fit, molding, or any other suitable manner.

The embodiment of FIG. 3 may further include a feature, such as the projection 78 and the groove 84 described in detail with respect to the embodiment of FIG. 2, to prevent movement of the stop member 92 and/or gasket 94 out of the recess 54 along the longitudinal axis 88 and/or rotationally through the recess 54 and about the longitudinal axis, as depicted by reference numeral 90. In an illustrative embodiment, a single or multiple projections 78 and/or grooves 84 may be utilized.

While the stop member 92 and the gasket 94 are depicted herein as each being a single, unitary piece, the stop member 92 and/or the gasket 94 may include multiple stop members or gasket members, respectively, either spaced from or adjacent one another. Further, while the recess 54, the stop member 92, and the gasket 94 are shown and described as being annular, the recess 54, the stop member 92, and/or gasket 94 may have any other suitable shape. Still further, while specific dimensions are described herein, the components of the stop member 92 and the gasket 94 may have any suitable dimensions.

Figure 4:
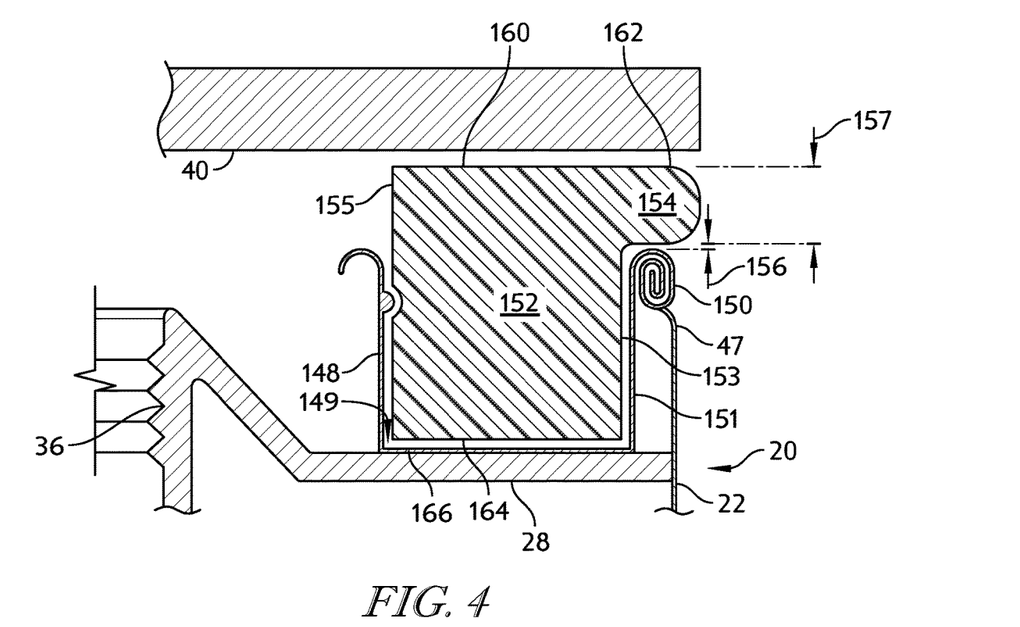
FIG. 4 is a partial cross-sectional view of a third embodiment of a feature for assisting in the installation of a fluid filter, wherein the feature is incorporated within the fluid filter shown in FIG. 1 and taken generally along the lines 2-2 of FIG. 1, wherein the fluid filter is shown prior to installation.

Referring to FIG. 4, a further embodiment of feature of assisting in the installation of a fluid filter is shown. The fluid filter 20 is similar to the fluid filter 20 of FIGS. 1-3 and, thus, like elements will be labeled with like reference numerals. FIG. 4 depicts a cross-sectional view of half of the filter 20 between the threaded portion 36 and an outer peripheral edge 47 of the filter 20. A channel member 148 may be coupled to the filter body 22 by welding or crimping, for example, to form a lockseam 150. The channel member 148 has a generally thin walled body with an outer peripheral edge 151 adjacent the body 22. The channel member 148 defines an annular recess 149 having an open end. The recess 149 is sized to receive an annular body 152 of a gasket 155. The gasket 155 further includes a lip 154 that extends outwardly from an outer peripheral edge 153 of the gasket body 152. The annular body 152 has a top surface 160 and the lip 154 has a top surface 162, wherein the top surface 160 may be integrally formed with the top surface 162. In an illustrative embodiment, the lip 154 extends outwardly from the outer peripheral edge 153 of gasket body 152 to the outer peripheral edge 47 of the filter body 22. The lip 154 is positioned above the lockseam 150 and separated from the lockseam 150 by a distance 156. In an illustrative embodiment, the distance 156 is approximately three-quarters of the pitch of threaded portion 36. In another illustrative embodiment, the distance 156 is approximately 0.045 inches (1.145 mm). While the lip 154 is shown as extending outwardly from the annular body 152, the lip 154 could alternatively extend inwardly from the annular body 152.

The gasket body 152 and the lip 154 may be made from rubber and/or any other suitable material. In an illustrative embodiment, the lip 154 is approximately 0.20 inches thick, as indicated by reference number 157, and slightly compressible. In an illustrative embodiment where the lip 154 is compressible, the amount the lip 154 can be compressed is approximately 0.045 inches. The lip 154 may also be made from any suitable material or materials, for example a plastic material, such as nylon. The use of nylon as a material for the lip 154 may provide advantages in that it reduces the risk of marring an interface between the surface 40 of the engine mounting base and the lip 154.

Figure 5:
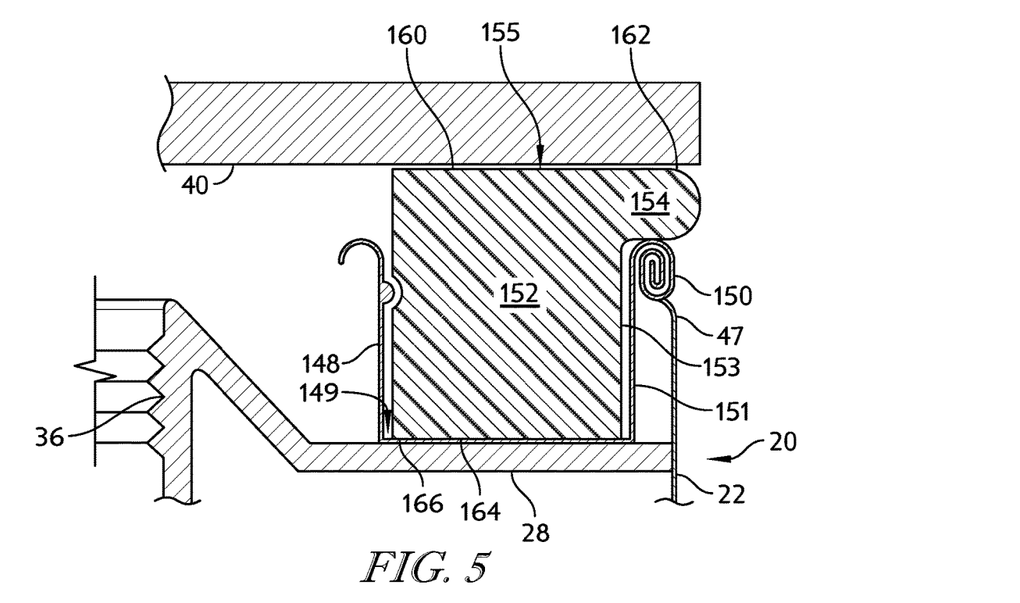
FIG. 5 is a partial cross-sectional view similar to that of FIG. 4 and depicting the fluid filter of FIG. 4 after installation.

Referring to FIG. 5, to install the filter 20, an old filter is first removed from the system (e.g. the internal combustion engine, not shown). With the old filter removed, the threaded portion 36 is coupled to a corresponding threaded stem on the engine, for example. The filter 20 is rotated until the top surfaces 160, 162 of the gasket body 152 and the lip 154, respectively, contact the surface 40 of the engine. Once the surface 40 contacts the top surfaces 160, 162 of the gasket body 152 and the lip 154 and a lower surface 164 of the gasket body 152 is in contact with a lower surface 166 of the channel member 148, the torque required to continue rotation increases dramatically, thereby indicating to the installer that the filter 20 has been installed properly and that the gasket body 152 and the lip 154 have been compressed to the desired amount. The lip 154 creates a hard stop when the proper gasket compression is met. This stop is achieved by precisely controlling the recess dimension in the bottom assembly of the filter 20 and the distance 156. Once the filter 20 is installed, the lip 154 is in contact with the lockseam 150 and protects the filter 20 from metal to metal contact. It should be appreciated that the filter 20 provides advantages in allowing a desired seal to be formed between the filter and the engine without the installer having to monitor the number of turns or the amount that the filter 20 is rotated.

While the gasket 155 is depicted herein as a single, unitary piece, the gasket 155 may include multiple gasket members either annularly spaced from or adjacent one another. Further, while the recess 149 and the gasket 155 are shown and described as being annular, the recess 149 and/or gasket 155 may have any other suitable shape. Still further, while specific dimensions are described herein, the components of the gasket 155 may have any suitable dimensions.

Figure 6:
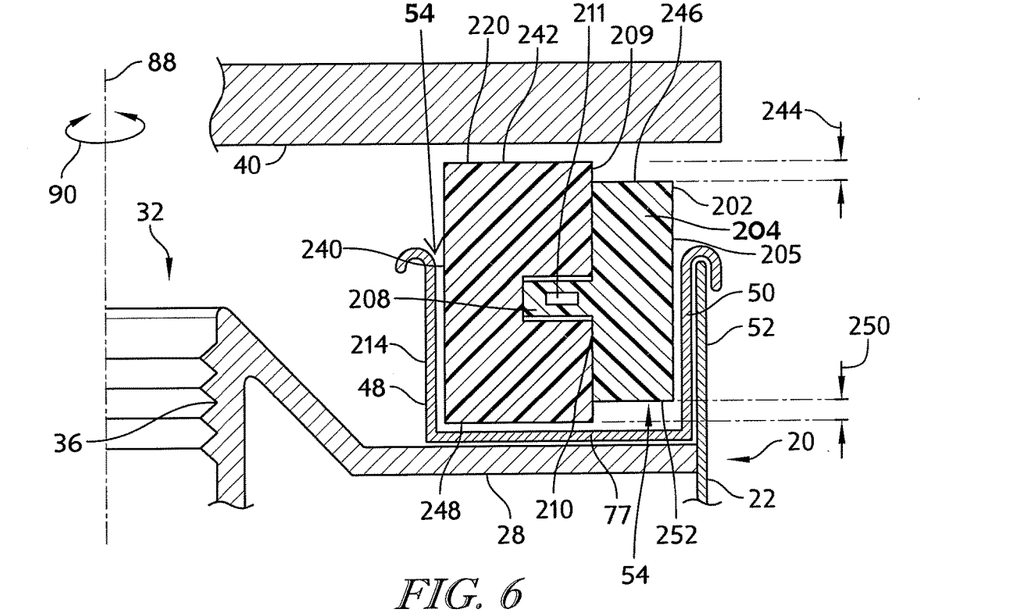
FIG. 6 is a partial cross-sectional view of a further feature for assisting in the installation of the fluid filter, wherein the feature is incorporated within the fluid filter shown in FIG. 1 and taken generally along the lines 2-2 of FIG. 1, wherein the fluid filter is shown prior to installation.
Figure 7:
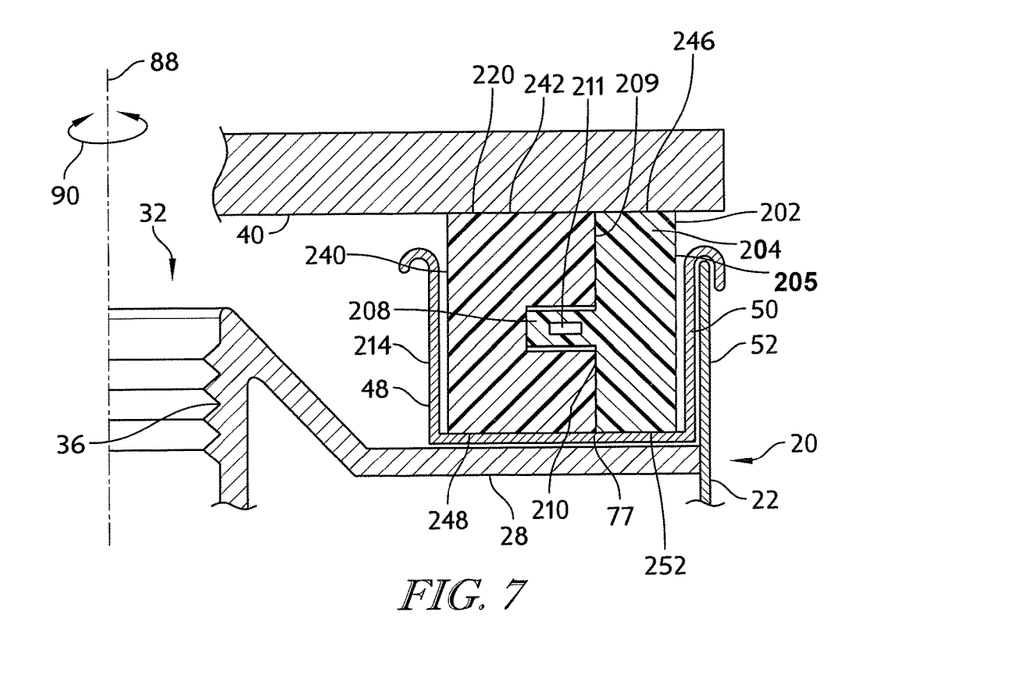
FIG. 7 is a partial cross-sectional view similar to that of FIG. 6 and depicting the fluid filter of FIG. 6 after installation.
Figure 8:
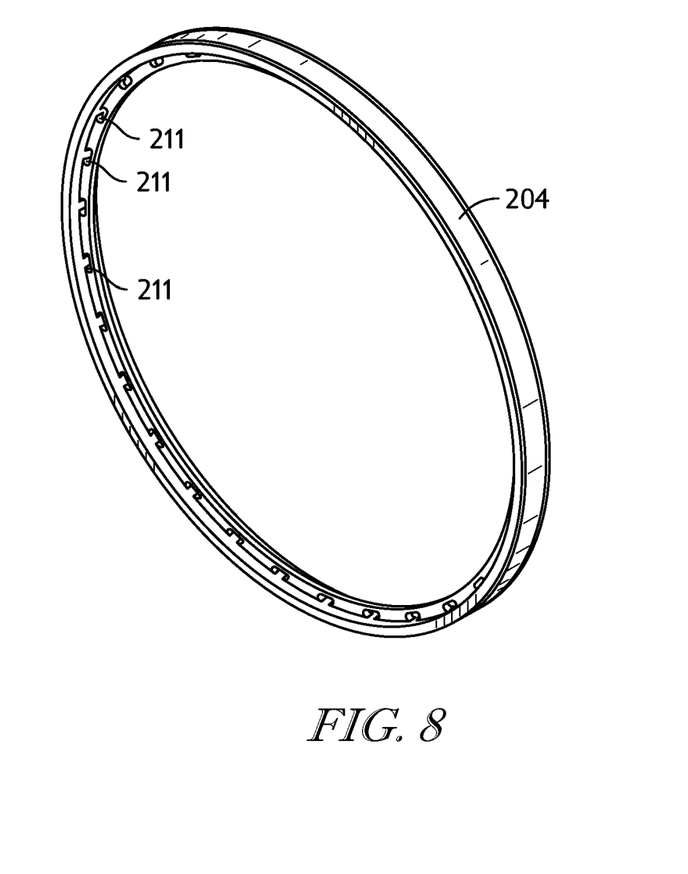
FIG. 8 is an isometric view of a stop member of the feature of FIG. 6.

A further illustrative embodiment of a feature for assisting in installation of the filter 20 is shown in FIG. 6. The fluid filter 20 is identical to the fluid filter 20 of FIGS. 1-3 and, thus, the same reference numerals will be used with respect to the fluid filter 20. As noted above, the channel member 48 may be coupled, such as by welding or any other known manner, between the tapping plate 28 and the body 22. The channel member 48 has a generally thin walled body with an outer peripheral edge 50 adjacent an outer edge 52 of the body 22. The channel member 48 defines an annular recess 54 having an open end. The recess 54 is sized to accommodate a stop member 202 and a gasket member 220, as seen in FIGS. 6 and 7. The stop member 202 includes a first section 204 that is generally parallel to the longitudinal axis 88 of the fluid filter 20 and having an outer surface 205 spaced from or abutting the outer peripheral edge 50 of the channel member 48 and a second section 208 that extends generally perpendicular from the first section 204. The second section 208 is shown as extending inwardly from the first section 204, but alternatively, may extend outwardly therefrom. In such an embodiment, an inner surface 210 of the first section 204 may be spaced from or abutting an inner wall 209 of the gasket member 220 and the second section 208 may extend inwardly from the first section 204 past the inner wall 209 of the gasket member 220. In an illustrative embodiment, a plurality of apertures 211 extend through the second section 208. Any number of apertures 211 may be annularly spaced about the second section 208. The stop member 202 may be made, for example, of nylon, or any other suitable material.

Referring again to FIG. 6, the gasket member 220 may be attached or molded to the stop member 202. The gasket member 220 may be less rigid than the stop member 202 and may be made of any suitable light-weight, low cost moldable and compressible plastic material, such as rubber, for example. In an illustrative embodiment, the stop member 202 is held in a mold and the gasket member 220 is molded to the stop member 202 by introducing or injection molding the gasket member material around portions of the stop member 202. In an illustrative embodiment, the material is injected adjacent the inner surface 210 of the first section 204 of the stop member 202 and around the second section 208 of the stop member 202. The gasket material flows through the apertures 211 in the second section 208, such that, when the gasket material sets to form the gasket member 220, the material of the gasket member 220 extends through the apertures 211 to attach the gasket member 220 to the stop member 202. While one manner of attaching the gasket member 220 to the stop member 202 is disclosed and described in detail, any other suitable methods of attachment may be utilized.

The stop member 202 with attached gasket member 220 is positioned within the recess 54 of the channel member 48 such that the outer surface 205 of the stop member 202 is spaced from or abutting the outer peripheral edge 50 of the channel member 48 and an inner peripheral surface 240 of the gasket member 220 is spaced from or abutting an inner wall 214 of the channel member 48.

As seen in FIG. 6, the gasket member 220 includes an upper surface 242 that extends a distance 244 above an upper surface 246 of the stop member 202 and may include a lower surface 248 that extends a distance 250 below a lower surface 252 of the stop member 202. In an illustrative embodiment, the sum of the distances 244, 250 is about three-quarters of the pitch of the threaded portion 36. In another illustrative embodiment, the sum of the distances 244, 250 is about 0.045 inches (1.145 mm). In an illustrative embodiment, if the distance 250 between the lower surfaces 248, 252 of the gasket and stop members 220, 202 is omitted, the distance 244 may be about three-quarters of the pitch of the threaded portion 36. In an illustrative embodiment, if the distance 250 between the lower surfaces 248, 252 of the gasket and stop members 220, 202 is omitted, the distance 244 may be about 0.045 inches (1.145 mm).

To install the filter 20, an older filter is first removed from the system (e.g., the internal combustion engine, not shown). With the old filter removed, the threaded portion 36 is coupled to the corresponding threaded stem on the engine. Rotation of the filter 20 causes tightening of the filter and compression of the gasket member 220 until the upper surface 246 and the lower surface 252 of the stop member 202 are in contact with the surface 40 and the horizontal wall 77 of the channel member 48, respectively. At that point, the torque required to continue rotation increases dramatically, thereby indicating to the installer that the filter 20 has been installed properly and the gasket 220 and possibly the stop member 202 have been compressed the desired amount. It should be appreciated that the filter 20 provides advantages in allowing a desired seal to be formed between the filter 20 and the engine without the installer having to monitor the number of turns or the mount that the filter 20 is rotated.

While the stop member 202 and the gasket member 220 are depicted herein as each being a single, unitary piece, the stop member 202 and/or the gasket member 220 may include multiple stop or gasket members, respectively, either spaced from or adjacent one another. Further, while the recess 54, the stop member 202, and the gasket member 220 are shown and described as being annular, the recess 54, the stop member 202, and/or the gasket member 220 may have any other suitable shape. Still further, while specific dimensions are described herein, the components of the stop member 202 and the gasket member 220 may have any suitable dimensions.

While the embodiments herein are disclosed and discussed herein with respect to particular embodiments of filters, one skilled in the art will understand that the concepts of the present invention may be incorporated within any suitable filter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

Any of the embodiments described herein may be modified to include any of the structures or methodologies disclosed in connection with other embodiments.

Further, although directional terminology, such as front, back, top, bottom, upper, lower, etc. may be used throughout the present specification, it should be understood that such terms are not limiting and are only utilized herein to convey the orientation of different elements with respect to one another.

The invention claimed is:

1. A fluid filter comprising:
a body having a first, closed end and a second, open end;
a plate coupled to the second end of the body, the plate having a threaded portion;
a channel member having an outer edge coupled to the second end of the body, the channel member defining a recess;
a stop member disposed within the recess of the channel member, wherein the stop member includes a first surface with a first groove and a second, opposite surface with a second groove;
a first sealing member coupled to the first groove of the stop member and a second sealing member coupled to the second groove of the stop member, the first sealing member having a first height extending beyond the first surface of the stop member and the second sealing member having a second height extending beyond the second surface of the stop member;
wherein the first height of the first sealing member is offset from a height of the first surface of the stop member by a first distance, and the second height of the second sealing member is offset form a height of the second surface of the stop member by a second distance; and
wherein a combination of the first distance and the second distance is about an amount that equates to three-quarters of the thread pitch of the threaded portion.

2. A fluid filter comprising:
a body having a first, closed end and a second, open end;
a plate coupled to the second end of the body, the plate having a threaded portion;
a channel member having an outer edge coupled to the second end of the body, the channel member defining a recess;
a stop member disposed within the recess of the channel member, wherein the stop member includes a first surface with a first groove and a second, opposite surface with a second groove;
a first sealing member coupled to the first groove of the stop member and a second sealing member coupled to the second groove of the stop member, the first sealing member having a first height extending beyond the first surface of the stop member and the second sealing member having a second height extending beyond the second surface of the stop member;
wherein the first height of the first sealing member is offset from a height of the first surface of the stop member by a first distance, and the second height of the second sealing member is offset form a height of the second surface of the stop member by a second distance; and
wherein a combination of the first distance and the second distance is about an amount between three-quarters and one of a thread pitch of the threaded portion.

3. The fluid filter of claim 2, wherein the channel member includes a projection extending outwardly from an inner surface of a side wall, and the stop member includes a groove on an outer surface thereof that couples with the projection of the channel member.

4. The fluid filter of claim 2, wherein the channel member includes a groove in an inner surface of a side wall, and the stop member includes a projection extending outward from an outer surface thereof which couples with the groove of the channel member.

5. The fluid filter of claim 2, wherein the stop member is plastic.

6. The fluid filter of claim 2, wherein a combination of the first distance and the second distance is about 0.045 inches.

7. The fluid filter of claim 2, wherein the first distance is approximately the same as the second distance.

* * * * *